(12) United States Patent
Fuoco

(10) Patent No.: US 11,653,645 B2
(45) Date of Patent: May 23, 2023

(54) FOAM SANITIZER COMPOSITION

(71) Applicant: Protair-X Health Solutions Inc., Boucherville, CA (US)

(72) Inventor: Domenico Fuoco, Montreal (CA)

(73) Assignee: Protair-X Health Solutions Inc., Boucherville, CA (US)

( * ) Notice: Subject to any disclaimer, the term of this patent is extended or adjusted under 35 U.S.C. 154(b) by 427 days.

(21) Appl. No.: 16/408,194

(22) Filed: May 9, 2019

(65) Prior Publication Data

US 2019/0343116 A1    Nov. 14, 2019

Related U.S. Application Data

(60) Provisional application No. 62/669,902, filed on May 10, 2018.

(51) Int. Cl.
| | | |
|---|---|---|
| A01N 25/22 | (2006.01) | |
| A01N 25/32 | (2006.01) | |
| A01N 25/30 | (2006.01) | |
| A01N 31/02 | (2006.01) | |

(52) U.S. Cl.
CPC ............. *A01N 25/22* (2013.01); *A01N 25/30* (2013.01); *A01N 25/32* (2013.01); *A01N 31/02* (2013.01)

(58) Field of Classification Search
None
See application file for complete search history.

(56) References Cited

U.S. PATENT DOCUMENTS

| | | |
|---|---|---|
| 6,183,766 B1 | 2/2001 | Sine et al. |
| 6,333,039 B1 | 12/2001 | Fendler et al. |
| 6,423,329 B1 | 7/2002 | Sine et al. |
| 6,524,594 B1 | 2/2003 | Santora et al. |
| 6,977,082 B2 | 12/2005 | Seitz, Jr. et al. |
| 7,199,090 B2 | 4/2007 | Koivisto et al. |
| 7,651,990 B2 | 1/2010 | Asmus |
| 7,723,279 B2 | 5/2010 | Lestage et al. |
| 7,803,390 B2 | 9/2010 | Asmus et al. |
| 8,058,315 B2 | 11/2011 | Wegner et al. |
| 8,062,649 B2 | 11/2011 | Asmus et al. |
| 8,097,265 B2 | 1/2012 | Biering et al. |
| 8,263,098 B2 | 9/2012 | Fernandez de Castro et al. |
| 8,333,954 B2 | 12/2012 | Seidling et al. |
| 8,658,701 B2 | 2/2014 | Wegner et al. |
| 8,679,516 B2 | 3/2014 | Fernandez de Castro et al. |
| 8,697,103 B2 | 4/2014 | Veeger et al. |
| 9,089,129 B2 | 7/2015 | Heisig et al. |
| 9,212,987 B2 | 12/2015 | Copeland et al. |
| 9,439,841 B2 | 9/2016 | Wegner et al. |
| 9,497,962 B1 | 11/2016 | O'Lenick, Jr. |
| 9,717,669 B2 | 8/2017 | Cozean et al. |
| 2006/0281663 A1 | 12/2006 | Asmus |
| 2008/0051312 A1* | 2/2008 | Lestage ................ C11D 3/2006 510/421 |
| 2013/0011490 A1* | 1/2013 | Fernandez de Castro ................ A01N 25/30 424/618 |
| 2015/0132401 A1* | 5/2015 | Collins .................. A61K 31/19 424/520 |

FOREIGN PATENT DOCUMENTS

| | | |
|---|---|---|
| CA | 2540085 | 4/2005 |
| CA | 2589502 | 6/2006 |
| CA | 2572107 | 6/2007 |
| CA | 2621986 | 8/2008 |
| CA | 2865119 | 8/2013 |
| DE | 202008017123 | 3/2009 |
| EP | 1765260 | 3/2007 |
| EP | 2020221 | 2/2009 |
| EP | 2407148 | 1/2012 |
| EP | 2041254 | 11/2012 |
| EP | 2844215 | 3/2015 |
| EP | 2844217 | 3/2015 |
| WO | WO 2005/030917 | 4/2005 |
| WO | WO 2006/085907 | 8/2006 |
| WO | WO 2006/094387 | 9/2006 |
| WO | WO 2008/003779 | 1/2008 |
| WO | WO 2008/067028 | 6/2008 |
| WO | WO 2013/164708 | 11/2013 |
| WO | WO 2013/164709 | 11/2013 |
| WO | WO 2014/043787 | 3/2014 |
| WO | WO 2016/085906 | 6/2016 |
| WO | WO 2017/055797 | 4/2017 |
| WO | WO 2018/022016 | 2/2018 |

OTHER PUBLICATIONS

International Search Report and Written Opinion issued for International Application No. PCT/IB2019/053849 dated Aug. 22, 2019.
Preston, Inc. Private Label Skincare, "Glossary of Cosmetic Ingredients, Essential Oils and Botanical Extracts," 2007.
Supplementary Search Report issued in EPC Application No. 19800631.4 dated Feb. 2, 2022.

\* cited by examiner

*Primary Examiner* — Nicole P Babson
(74) *Attorney, Agent, or Firm* — Klarquist Sparkman, LLP

(57) ABSTRACT

Disclosed herein are embodiments of a foam sanitizer composition and methods of making and using the foam sanitizer composition. The foam sanitizer composition embodiments disclosed herein exhibit good foam stability even with high amounts of alcohol. In particular embodiments, the foam sanitizer composition comprises a denatured alcohol, one or more surfactants, a foam stabilizing polymer, a hydrating agent, one or more active agents, and a solvent.

11 Claims, No Drawings

FOAM SANITIZER COMPOSITION

CROSS-REFERENCE TO RELATED APPLICATION

This application claims priority to U.S. Provisional Application No. 62/669,902, filed on May 10, 2018, which is incorporated herein by reference in its entirety.

FIELD

The present disclosure concerns embodiments of a foam sanitizer composition and methods of making and using the same.

BACKGROUND

Sanitizing compositions having high amounts of alcohol, such as over 60%, typically exhibit low foam stability and are not desirable for producing foam sanitizing compositions. There exists a need in the art for compositions that use high amounts of alcohol but that still exhibit suitable foam stability for consumer use.

SUMMARY

Disclosed herein are embodiments of a foam sanitizer composition that can include high amounts of alcohol and that also exhibit suitable foam stability for consumer use. In some embodiments, the composition can comprise an alcohol, one or more surfactants, one or more active agents, a hydrating agent, a foam stabilizing polymer, and water. Additional compositional embodiments are disclosed herein. Also disclosed herein are methods of making and using the foam sanitizer compositions.

The foregoing and other objects and features of the present disclosure will become more apparent from the following detailed description.

DETAILED DESCRIPTION

I. Overview of Terms

The following explanations of terms and methods are provided to better describe the present disclosure and to guide those of ordinary skill in the art in the practice of the present disclosure. The singular forms "a," "an," and "the" refer to one or more than one, unless the context clearly dictates otherwise. The term "or" refers to a single element of stated alternative elements or a combination of two or more elements, unless the context clearly indicates otherwise. As used herein, "comprises" means "includes." Thus, "comprising A or B," means "including A, B, or A and B," without excluding additional elements. All references, including patents and patent applications cited herein, are incorporated by reference.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is expressly recited.

Unless explained otherwise, all technical and scientific terms used herein have the same meaning as commonly understood to one of ordinary skill in the art to which this disclosure pertains. Although methods and materials similar or equivalent to those described herein can be used in the practice or testing of the present disclosure, suitable methods and materials are described below. The materials, methods, and examples are illustrative only and not intended to be limiting.

Alcohol: An organic compound including at least one hydroxyl group. Alcohols may be monohydric (including one —OH group), dihydric (including two —OH groups; diols, such as glycols), trihydric (including three —OH; triols, such as glycerol) groups, or polyhydric (including three or more —OH groups; polyols). The organic portion of the alcohol may be aliphatic, cycloaliphatic (alicyclic), heteroaliphatic, cycloheteroaliphatic (heterocyclic), polycyclic, aryl, or heteroaryl, and may be substituted or unsubstituted. In some embodiments, the alcohol is ethanol, isopropanol, n-propanol, or mixtures thereof.

Cleansing Surfactant: A surfactant compound capable of emulsifying and washing away contaminants present on a subject's skin, such as oil and/or dirt. Solely by way of example, an exemplary cleansing surfactant can be cocamidopropyl betaine.

Emulsifier: A surfactant compound that stabilizes an emulsion. Solely by way of example, an exemplary emulsifier can be a polyether-modified silicone.

Foam Boosting Surfactant: A surfactant compound that increases the detergency and/or foaming properties of a composition as compared to a level of detergency and/or foaming exhibited by a composition without the foam boosting surfactant. Solely by way of example, an exemplary foam boosting surfactant is cocamide monethanolamine (MEA).

Gel: A colloidal system comprising a solid three-dimensional network within a liquid. By weight, a gel is primarily liquid, but behaves like a solid due to a three-dimensional network of entangled and/or crosslinked molecules of a solid within the liquid. From a rheological perspective, a gel has a storage modulus G' value which exceeds that of the loss modulus G". The storage modulus is a measure of the energy stored in a material in which a deformation (e.g., sinusoidal oscillatory shear) has been imposed; storage modulus can be thought of as the proportion of total rigidity of a material that is attributable to elastic deformation. The loss modulus is a measure of the energy dissipated in a material in which a deformation (e.g., sinusoidal oscillatory shear) has been imposed; loss modulus can be thought of as the proportion of the total rigidity of a material that is attributable to viscous flow rather than elastic deformation. The storage modulus and loss modulus can be determined with a rheometer.

Polymer: A molecule of repeating structural units (e.g., monomers) formed via a chemical reaction, i.e., polymerization.

Subject: This term refers to mammals and other animals, particularly humans. Thus disclosed foam sanitizer compositions are applicable to both human therapy and veterinary applications.

Surfactant: A compound that reduces surface tension when dissolved in water or water-based solutions, or that reduces interfacial tension between two liquids. A surfactant molecule typically has a polar or ionic "head" and a nonpolar hydrocarbon "tail." Upon dissolution in water, the surfactant molecules aggregate and form micelles, in which the nonpolar tails are oriented inward and the polar or ionic heads are oriented outward toward the aqueous environment. Micelles typically are spherical in shape and small, with diameters of less than about 10 nm. The nonpolar tails create a nonpolar "pocket" within the micelle. Nonpolar compounds in the solution are sequestered in the pockets formed by the surfactant molecules, thus allowing the nonpolar compounds to remain mixed within the aqueous solution.

Thickening Surfactant: A surfactant compound that increases the viscosity of a composition, or a component contained therein, without substantially changing other properties of the composition, the increase being an increase as compared to the viscosity of a composition, or a component contained therein, without the thickening surfactant. Solely by way of example, an exemplary thickening surfactant can be cocamidopropyl betaine.

Wetting Agent: A surfactant compound that increases the spreading and/or penetrating properties of a composition, or a component contained therein, by lowering its surface tension, the increase being an increase as compared to the spreading and/or penetrating properties of a composition, or a component contained therein, without the wetting agent.

II. Foam Sanitizer Compositions

Disclosed herein is a foam sanitizer composition. In particular disclosed embodiments, the foam sanitizer composition is a foam hand sanitizer composition. The disclosed foam sanitizer compositions have high amounts of alcohol that promote quick drying during use and that do not leave a sticky residue. The components used in the foam sanitizer composition can be USP grade, cosmetic grade, or both.

Embodiments of the foam sanitizer composition can comprise, consist essentially of, or consist of an alcohol (such as a denatured alcohol), one or more surfactants, a foam stabilizing polymer, a thickening polymer, a hydrating agent, a solvent, and one or more active agents. In some embodiments where the foam sanitizer composition consists essentially of an alcohol (such as a denatured alcohol), one or more surfactants, a foam stabilizing polymer, a thickening polymer, a hydrating agent, a solvent, and one or more active agents, the foam sanitizer composition is free (or substantially free) of components that deleteriously affect the ability of the composition to produce a foam and/or that reduce foam stability. In some embodiments, the foam sanitizer composition can further comprise a skin protectant, such as yucca.

In some embodiments, the one or more surfactants can be a thickening surfactant, a foam boosting surfactant, a cleansing surfactant, a wetting agent, an emulsifier, or any combination thereof. In exemplary embodiments, the foam sanitizer composition comprises the following surfactants: a regular surfactant, a foam boosting surfactant, a thickening surfactant, a polyether-modified silicone emulsifier, and an emulsifying agent. Some surfactant compounds disclosed herein can exhibit properties that facilitate their use for different purposes, such as thickening, cleansing, wetting, foam boosting, and/or emulsifying.

In one embodiment, the foam sanitizer composition comprises, consists essentially of, or consists of denatured ethanol, cocamide MEA, poly(ethylene glycol) 23M, cocamidopropyl betaine, glycerin, vitamin E, panthenol, PEG-7 glyceryl cocoate, PEG/PPG-18/18 dimethicone, and water. In some embodiments, the cocamide MEA is Rheomide CMEA-95. In some embodiments, the poly(ethylene glycol) 23M is PEO 3 (solution, 4.5%). In some embodiments, the cocamidopropyl betaine is CHEMBETAINE C. In some embodiments, the PEG-7 glyceryl cocoate is CETIOL HE. In some embodiments, the vitamin E is vitamin E acetate oil. In some embodiments, the PEG/PPG-18/18 dimethicone is XIAMETER OFX-190 Fluid. In some embodiments, the water is deionized water.

In another embodiment, the foam sanitizer composition comprises, consist essentially of, or consists of an alcohol, a foam stabilizing polymer, a yucca mixture, three or more surfactants, a thickening polymer and a solvent. In such embodiments, the foam sanitizer composition can comprise PEG-23M at 4.5%, YuccaYD50, alkyl polyglucoside, cocamidopropyl betaine, hypromellose 0.5%, decyl glucoside, and water.

The components listed above can be included in any suitable amount. In some embodiments, the foam sanitizer composition comprises, consists essentially of, or consists of 70 wt % to 85 wt % denatured ethanol (95%), 1 wt % to 3 wt % cocamide MEA, 0.1 wt % to 0.5 wt % poly(ethylene glycol) 23M, 3 wt % to 5 wt % cocamidopropyl betaine, 0.5 wt % to 0.9 wt % glycerin, 0.02 wt % to 0.07 wt % vitamin E, 0.05 wt % to 0.15 wt % panthenol, 2 wt % to 4 wt % PEG-7 glyceryl cocoate, 0.2 wt % to 2 wt % PEG/PPG-18/18 dimethicone, and the balance is made up with water. In some embodiments, the foam sanitizer composition comprises, consists essentially of, or consists of 60 wt % to 74wt % ethanol, 5 wt % to 10 wt % PEG-23M at 4.5%, 1 wt % to 5 wt % YuccaYD50, 1 wt % to 5 wt % alkyl polyglucoside, 1 wt % to 5 wt % cocamidopropyl betaine, 1 wt % to 6 wt % hypromellose 0.5%, 1 wt % to 3 wt % decyl glucoside, and 1 wt % to 30 wt % water.

In some embodiments, the foam sanitizer composition comprises, consists essentially or, or consists of 78 wt % denatured ethanol (95%), 2 wt % cocamide MEA, 0.27 wt % poly(ethylene glycol) 23M, 4 wt % cocamidopropyl betaine, 0.75 wt % glycerin, 0.05 wt % vitamin E, 0.1 wt % panthenol, 3 wt % PEG-7 glyceryl cocoate, 1.75 wt % PEG/PPG-18/18 dimethicone, and 10.08 wt % water. In yet additional embodiments, the foam sanitizer composition comprises, consists essentially or, or consists of 80 wt % denatured ethanol (95%), 2 wt % cocamide MEA, 6 wt % poly(ethylene glycol) 23M, 4 wt % cocamidopropyl betaine, 0.75 wt % glycerin, 0.05 wt % vitamin E, 0.1 wt % panthenol, 3 wt % PEG-7 glyceryl cocoate, 1.75 wt % PEG/PPG-18/18 dimethicone, and the balance wt % made up with water. In yet additional embodiments, the foam sanitizer composition comprises, consists essentially of, or consists of 74 wt % ethanol, 4 wt % Yucca YD50, 2.2 wt % CMEA, 1 wt % glycerin, 0.5 wt % PEG-7 glyceryl cocoate, and either 1.5 wt %, 2.25 wt %, or 3 wt % of a silicon-containing surfactant (e.g., silicon GRANSIL VX-419, SILWAX J219-M, SILSURF 400R, or PEG/PPG-18/18 dimethicone).

In particular embodiments, the foam sanitizer composition is a transparent liquid. In some embodiments, the liquid can have a slight yellowish color. The foam sanitizer composition typically has a pH ranging between 6.5 and 7.5. In particular embodiments, the foam sanitizer composition passes a foam test whereby the foam remains foamed for between nine seconds to 30 seconds. The foam test can comprise placing a sufficient quantity of the foam sanitizer composition into a bottle (typically the bottle that is used for packaging/sale of the foam sanitizer composition) and then an amount of the foam sanitizer composition is dispensed from the bottle onto a piece of support paper and the level of foam is assessed over a suitable time period.

III. Method of Making

Also disclosed herein are embodiments of a method for making the disclosed foam sanitizer composition. In some embodiments, the method can comprise first adding a surfactant, such as a foam booster surfactant, to the alcohol and mixing until the surfactant is completely, or at least substantially, dissolved in the alcohol to thereby form an alcohol-based mixture. Separately, a 4.5% solution of the foam stabilizing polymer is prepared and is allowed to completely hydrate until a clear and uniform gel is formed. This uniform gel is then added to the alcohol-based mixture to form a polymer-containing mixture, which is then mixed until it becomes transparent. Another surfactant, such as a thickening surfactant is added to the transparent polymer-containing mixture and is mixed at medium speed. Each of the hydrating agent, any active agents, and other surfactants (e.g., a normal surfactant, which reduces the surface tension of the composition) is then added. To this resulting mixture is added water, followed by the final surfactant, such as an emulsifying surfactant. The foam sanitizer composition is then mixed for a sufficient period of time until a homogeneous mixture is obtained.

IV. Methods of Use

The disclosed foam sanitizer composition is useful for sanitizing the skin. In some embodiments, the foam sanitizer composition is applied topically to the exposed skin of a subject, such as the subject's hands. The disclosed foam sanitizer composition embodiments exhibit good foam stability. In some embodiments, the foam sanitizer composition embodiments can maintain a minimum of nine seconds of foam stability as determined using a suitable foam stability test (e.g., a 3S test, wherein the foam produced from the foam sanitizer composition retains foam height for at least three seconds and typically no more than 30 seconds). The foam sanitizer composition can be used by subjects to sanitize skin in place of conventional cleansing components, such as soap and water. The amount of the foam sanitizer composition applied to the subject's skin and the frequency of use can vary depending on the level of disinfection desired and/or the surface area to be covered with the foam sanitizer composition.

V. Overview of Several Embodiments

Disclosed herein are embodiments of a foam sanitizer composition. In some embodiments, the foam sanitizer composition comprises a denatured alcohol; one or more surfactants; a foam stabilizing polymer; a hydrating agent; one or more active agents; and a solvent.

In any or all of the above embodiments, the denatured alcohol is denatured ethanol.

In any or all of the above embodiments, the one or more surfactants is selected from a thickening surfactant, a foam boosting surfactant, a cleansing surfactant, a wetting agent, an emulsifier, or any combination thereof.

In any or all of the above embodiments, the one or more surfactants is selected from a regular surfactant, a foam boosting surfactant, a thickening surfactant, a polyether-modified silicone emulsifier, and an emulsifying agent.

In any or all of the above embodiments, the foam stabilizing polymer is poly(ethylene glycol) 23M.

In any or all of the above embodiments, the hydrating agent is glycerin.

In any or all of the above embodiments, the one or more active agents is selected from vitamin E, panthenol, or a combination thereof.

In any or all of the above embodiments, the solvent is water.

In any or all of the above embodiments, the composition can further comprise a skin protectant. In any or all of such embodiments, the skin protectant is yucca.

In any or all of the above embodiments, the foam sanitizer composition comprises ethanol; cocamide MEA; poly(ethylene glycol) 23M; cocamidopropyl betaine; glycerin; vitamin E; panthenol; PEG-7 glyceryl cocoate; PEG/PPG-18/18 dimethicone; and water.

In any or all of the above embodiments, the denatured alcohol is present in an amount ranging from 70 wt % to 85 wt %; the one or more surfactants is present in a total amount ranging from 6.2 wt % to 14 wt %; the foam stabilizing polymer is present in an amount ranging from 0.1 wt % to 0.5 wt %; the hydrating agent is present in an amount ranging from 0.5 wt % to 0.9 wt % glycerin; the one or more active agents are present in a total amount ranging from 0.07 wt % to 0.22 wt %; with any balance wt % of the foam sanitizer composition being water.

In any or all of the above embodiments, the foam sanitizer composition comprises: 70 wt % to 85 wt % denatured ethanol; 1 wt % to 3 wt % cocamide MEA; 0.1 wt % to 0.5 wt % poly(ethylene glycol) 23M; 3 wt % to 5 wt % cocamidopropyl betaine; 0.5 wt % to 0.9 wt % glycerin; 0.02 wt % to 0.07 wt % vitamin E; 0.05 wt % to 0.15 wt % panthenol; 2 wt % to 4 wt % PEG-7 glyceryl cocoate; 0.2 wt % to 2 wt % PEG/PPG-18/18 dimethicone, and water to make up a remaining wt % of the foam sanitizer composition.

In any or all of the above embodiments, the foam sanitizer composition comprises: 78 wt % denatured ethanol; 2 wt % cocamide MEA; 0.27 wt % poly(ethylene glycol) 23M; 4 wt % cocamidopropyl betaine; 0.75 wt % glycerin; 0.05 wt % vitamin E; 0.1 wt % panthenol; 3 wt % PEG-7 glyceryl cocoate; 1.75 wt % PEG/PPG-18/18 dimethicone; and 10.08 wt % water.

In some embodiments, the foam sanitizer composition consists essentially of: a denatured alcohol; one or more surfactants; a foam stabilizing polymer; a hydrating agent; one or more active agents; and a solvent.

In some embodiments, the foam sanitizer composition consists of a denatured alcohol; four surfactants; a foam stabilizing polymer; a hydrating agent; two active agents; and a solvent.

Also disclosed herein are embodiments of a method, comprising applying the foam sanitizer composition of claim 1 topically to exposed skin of a subject's hands.

VI. Examples

Example 1

In this example, six different embodiments of the disclosed foam sanitizer were prepared. The amounts of each component is provided below in Table 1.

TABLE 1

| Ingredients | #1 | #2 | #3 | #4 | #5 | #6 |
|---|---|---|---|---|---|---|
| 1 Denatured Ethanol 95% | 78.00 | 78.00 | 78.00 | 78.00 | 78.00 | 78.00 |
| 2 Cocamide MEA | 2.00 | 2.00 | 2.00 | 2.00 | 2.00 | 2.00 |
| 3 Poly(ethylene glycol) 23M | 0.10 | 0.14 | 0.18 | 0.23 | 6.00 | 0.50 |
| 4 Cocamidopropyl betaine 35% | 4.00 | 4.00 | 4.00 | 4.00 | 4.00 | 4.00 |
| 5 Glycerin | 0.75 | 0.75 | 0.75 | 0.75 | 0.75 | 0.75 |
| 6 Vitamin E | 0.05 | 0.05 | 0.05 | 0.05 | 0.05 | 0.05 |
| 7 Panthenol | 0.10 | 0.10 | 0.10 | 0.10 | 0.10 | 0.10 |
| 8 PEG-7 Glyceryl Cocoate | 3.00 | 3.00 | 3.00 | 3.00 | 3.00 | 3.00 |
| 9 Water | 11.80 | 11.36 | 10.92 | 10.47 | 4.35 | 9.60 |
| 10 PEG/PPG-18/18 dimethicone | 0.20 | 0.60 | 1.00 | 1.40 | 1.75 | 2.00 |
| TOTAL | 100.00 | 100.0 | 100.00 | 100.0 | 100.00 | 100.00 |

For each of the above foam sanitizer compositions, the following method was used to form the foam sanitizer composition:
1. Weigh 1, add 2, mixing until complete dissolution.
2. In another tank prepare 3 (4.5% PEO3 solution). Allow to completely hydrate until a clear and uniform gel is formed.
3. Add 3 (PEO 3 solution at 4.5%) in the mixture of Step 1, mix well until the mixture becomes transparent.
4. Add 4 and mix at medium speed.
5. Aside weighing 5, 6, 7 and 8 by mixing and adding it to the main vat.
6. Add 9 and 10 sequentially to the main tank, mixing to obtain a homogeneous mixture.

In view of the many possible embodiments to which the principles of the disclosed technology may be applied, it should be recognized that the illustrated embodiments are only preferred examples and should not be taken as limiting. Rather, the scope of the present disclosure is defined by the following claims. I therefore claim as my invention all that comes within the scope and spirit of these claims.

I claim:

1. A foam sanitizer composition consisting of:
a denatured alcohol;
a single foam boosting surfactant that is cocamide monoethanolamine (MEA);
three additional surfactants, which are present in addition to the single foam boosting surfactant and wherein each of the three additional surfactants are independently selected from cocamidopropyl betaine; PEG-7 glyceryl cocoate, PEG/PPG-18/18 dimethicone; polyether-modified silicone, alkyl polyglucoside, or decyl glucoside;
poly(ethylene glycol) 23M;
a hydrating agent;
two active agents; and
a solvent.

2. The foam sanitizer composition of claim 1, wherein the denatured alcohol is denatured ethanol.

3. The foam sanitizer composition of claim 1, wherein the hydrating agent is glycerin.

4. The foam sanitizer composition of claim 1, wherein the two active agents are vitamin E and panthenol.

5. The foam sanitizer composition of claim 1, wherein the solvent is water.

6. The foam sanitizer composition of claim 1, wherein the denatured alcohol is ethanol;
three additional surfactants are cocarnidopropyl betaine, PEG-7 glyceryl cocoate, and PEG/PPG-18/18 dimethicone;
the hydrating agent is glycerin;
the two active agents are vitamin E and panthenol; and
the solvent is water.

7. The foam sanitizer composition of claim 1, wherein the denatured alcohol is present in an amount ranging from 70 wt % to 85 wt %; the three additional surfactants and the single foam boosting surfactant are present in a total amount ranging from 6.2 wt % to 14 wt %; the poly(ethylene glycol) 23M is present in an amount ranging from 0.1 wt % to 0.5 wt %; the hydrating agent is present in an amount ranging from 0.5 wt % to 0.9 wt %; the two active agents are present in a total amount ranging from 0.07 wt % to 0.22 wt %;
with any balance wt % of the foam sanitizer composition being the solvent, which is water.

8. The foam sanitizer composition of claim 1, wherein:
the denatured alcohol is denatured ethanol, which is present in an amount ranging from 70 wt % to 85 wt %;
the cocamide MEA is present in an amount ranging from 1 wt % to 3 wt %;
the poly(ethylene glycol) 23M is present in an amount ranging from 0.1 wt % to 0.5 wt %;
the three additional surfactants are cocamidopropyl betaine in an amount ranging from 3 wt % to 5 wt %, PEG-7 glyceryl cocoate in an amount ranging from 2 wt % to 4 wt %, and PEG/PPG-18/18 dimethicone in an amount ranging from 0.2 wt % to 2 wt %;
the hydrating agent is glycerin, which is present in an amount ranging from 0.5 wt % to 0.9 wt %;
the two active agents are vitamin E in an amount ranging from 0.02 wt % to 0.07 wt % and panthenol in an amount ranging from 0.05 wt % to 0.15 wt %; and
the solvent is water, which is present in an amount to make up a remaining wt % of the foam sanitizer composition.

9. The foam sanitizer composition of claim 1, wherein:
the denatured alcohol is denatured ethanol, which is present in an amount of 78 wt %;
the cocamide MEA is present in an amount of 2 wt %;
the poly(ethylene glycol) 23M is present n an amount of 0.27 wt %;
the three additional surfactants are cocarnidopropyl betaine in an amount of 4 wt %, PEG-7 glyceryl cocoate in an amount of 3 wt %, and PEG/PPG-18/18 dimethicone in an amount of 1.75 wt %;
the hydrating agent is glycerin, which is present in an amount of 0.75 wt %;
the two active agents are vitamin E in an amount of 0.05 wt % and panthenol in an amount of 0.1 wt %; and
the solvent is water, which is present in an amount of 10.08 wt %.

10. The foam sanitizer composition of claim 1, wherein the foam sanitizer composition passes a foam test whereby the foam remains foamed for between nine seconds and 30 seconds.

11. A method, comprising applying the foam sanitizer composition of claim 1 topically to exposed skin of a subject's hands.

* * * * *

UNITED STATES PATENT AND TRADEMARK OFFICE
CERTIFICATE OF CORRECTION

PATENT NO. : 11,653,645 B2
APPLICATION NO. : 16/408194
DATED : May 23, 2023
INVENTOR(S) : Fuoco It is certified that error appears in the above-identified patent and that said Letters Patent is hereby corrected as shown below:

On the Title Page

Item (71), should read:
(71) Protair-X Health Solutions Inc.
Boucherville, Quebec, (CA)

In the Claims

Columns 7-8, please replace Claim 6 with the following:
6. The foam sanitizer composition of claim 16, wherein
    the denatured alcohol is ethanol;
    the three additional surfactants are cocamidopropyl betaine, PEG-7 glyceryl cocoate, and PEG/PPG-18/18 dimethicone;
    the hydrating agent is glycerin;
    the two active agents are vitamin E and panthenol; and
    the solvent is water.

Signed and Sealed this
Fourth Day of July, 2023

Katherine Kelly Vidal
*Director of the United States Patent and Trademark Office*